2,930,742

METHOD OF MAKING 9,10-PHENANTHRA-QUINONE

Edward L. Mihelic, Wilkinsburg, Pa., assignor to United States Steel Corporation, a corporation of New Jersey No Drawing. Application March 5, 1959
Serial No. 797,325

6 Claims. (Cl. 204—158)

This invention relates to an improved method of making 9,10-phenanthraquinone. The compound finds utility as a mildew-proofing agent (Patent 2,401,028), as a polymerization inhibitor (Patent 2,675,914) and a dyestuff (Patent No. 543,784).

While methods are known for making 9,10-phenanthraquinone, they require costly reagents or are so low in yield that the compound has not been available commercially in large quantities. It is therefore the object of my invention to provide a method which is inexpensive and utilizes a readily available source material of low cost.

In general terms, my improved method for preparing 9,10-phenanthraquinone consists of ultraviolet irradiation of a solution of 2,2'-biphenyldicarboxaldehyde in a suitable solvent containing a catalytic amount of benzoyl peroxide. The starting material is available in good yield from the ozonolysis of phenanthrene. Since the reaction involves a light-catalyzed internal condensation, no reactant other than the dialdehyde is involved. The reaction, in addition to giving substantial yields, is economical.

A complete understanding of the invention may be obtained from the following detailed explanation of a preferred practice.

In a 500-ml. round-bottom flask fitted with a reflux condenser and a sintered-glass aeration tube, 2.1 g. of 2,2'-biphenyldicarboxaldehyde was dissolved in 250 ml. of acetone containing 0.02 g. of benzoyl peroxide. The solution was then refluxed for 72 hours with continuous irradiation from a mercury vapor lamp (Hanovia Chemical and Manufacturing Co., Type 16200—filter removed). During use, the reaction flask was a distance of 5 to 6 inches from the lamp housing. During the reaction period, air was passed through the solution at a flow rate of approximately 0.06 s.c.f.m. After the reaction period, the acetone solvent was removed by evaporation. The residue was then mixed in 20 ml. of diethyl ether, and the mixture was filtered. The phenanthraquinone, being comparatively insoluble in ether, was retained on the filter. By this process, a conversion to phenanthraquinone of 45 to 50 mole percent was obtained. This represents a yield of 85% of the theoretical value, based on the dialdehyde consumed.

In a second example, the reaction solution containing 2.1 g. of 2,2'-biphenyldicarboxaldehyde in 150 ml. of acetone along with 0.02 g. of benzoyl peroxide, was irradiated by 80 hours of daylight at room temperature followed by 8 hours refluxing and irradiation from the mercury-vapor lamp as in the first example. The process for separating the phenanthraquinone was that already described. Conversion to phenanthraquinone was also 50 mole percent.

The use of acetone as the solvent appears to be necessary in order to obtain the yield described. Although some phenanthraquinone was obtained when tertiary butyl alcohol, acetic acid, or benzene was used, the yields were markedly lower.

When the addition of the benzoyl peroxide is initially omitted, no change in the reaction mixture can be readily noted. Upon subsequent addition of this component, the reaction is initiated, as evidenced by the development of an orange color in the reaction solution. Aeration of the reaction tended to give a final product of better color, in that aeration prevented the formation of phenanthraquin-hydrone, which tends to discolor the product. Furthermore, the accompanying effect of agitating the solution apparently tended to increase the efficiency of irradiation. The yield of phenanthraquinone appears to be most dependent upon the duration and efficiency of the irradiation.

The temperature of the solution during irradiation should be from 20 to 60° C., preferably from 50 to 60° C. The amount of acetone used to dissolve the dialdehyde may vary from 75 to 150 ml./g. The amount of peroxide may be from .005 to .01 per gram of dialdehyde. Prolonged exposure to ultraviolet light is desirable. About 72 hours is the minimum irradiation time for good yield at the intensity resulting from the described conditions but no appreciably greater yield is obtained by continuing it beyond 90 hours.

The 2,2'-biphenyldicarboxaldehyde may be readily made from phenanthrene by ozonolysis. As an example, the following procedure is typical:

The phenanthrene (30 g.) was suspended in 400 ml. of methanol. The reaction mixture was then ozonized for 2 hours and 15 minutes at —35 to —30° C., 110 volts, and 0.04 s.c.f.m. to give a total ozone concentration of 1.1 molar equivalents. The reaction mixture was then treated with 100 g. of potassium iodide and 100 ml. of glacial acetic acid. The iodine liberated during this treatment was reduced with an equivalent amount of sodium thiosulfate, and the reaction mixture was filtered. Upon removal of the methanol and further dilution with water, the 2,2'-biphenyldicarboxaldehyde was precipitated. This product was then further purified through preparation of its bisulfite addition compound.

It will be apparent from the foregoing that the invention provides a simple inexpensive method for making 9,10-phenanthraquinone from a readily available starting material.

Although I have disclosed herein the preferred practice of my invention, I intend to cover as well any change or modification therein which may be made without departing from the spirit and scope of the invention.

I claim:

1. A method of making 9,10-phenanthraquinone which comprises dissolving 2,2'-biphenyldicarboxaldehyde in acetone containing from .005 to .01 of benzoyl peroxide per gram of dialdehyde, irradiating the solution with ultraviolet light and collecting the precipitate formed.

2. A method as defined in claim 1, characterized by said solution being made up of about 100 ml. of acetone per gram of dialdehyde.

3. A method as defined in claim 1, characterized by said solution containing about .01 g. of peroxide per gram of dialdehyde.

4. A method as defined in claim 1, characterized by aerating the solution during irradiation.

5. A method as defined in claim 1, characterized by agitating the solution during irradiation.

6. A method as defined in claim 1, characterized by maintaining the solution at a temperature of from 20° to 60° C. during irradiation.

No references cited.